April 1, 1952 C. E. HUSTON 2,590,965
COLLAPSIBLE VEGETABLE PACKING APPARATUS
Filed Jan. 4, 1947 5 Sheets-Sheet 1
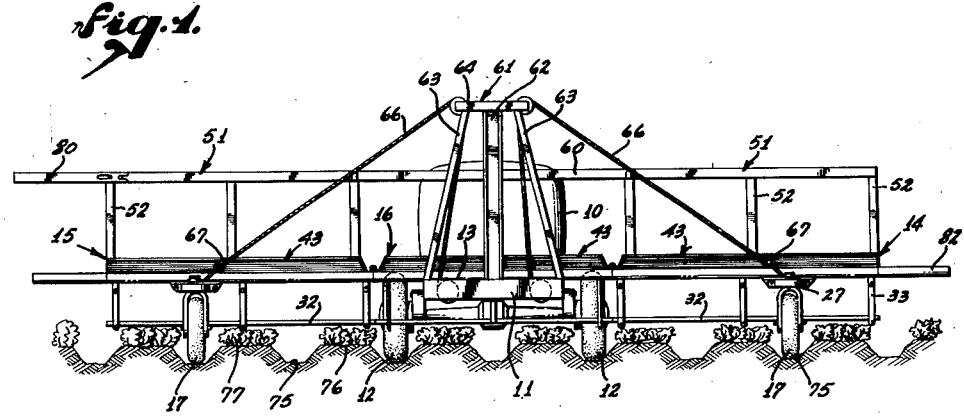
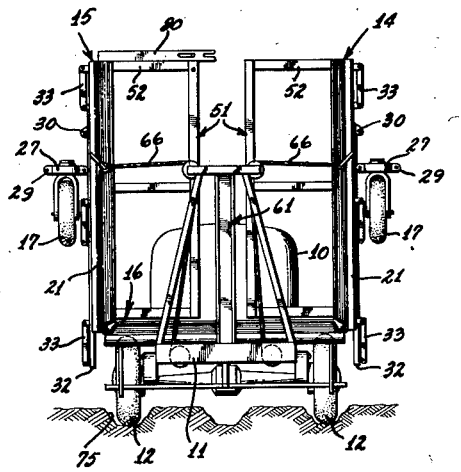
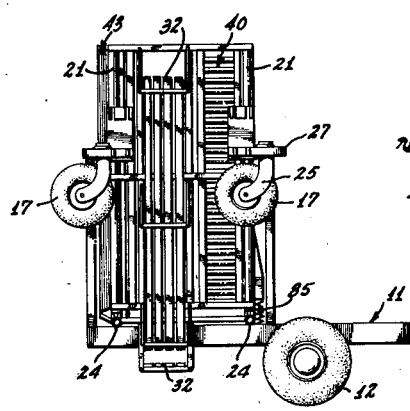
CHARLES E. HUSTON,
INVENTOR.
ATTORNEYS.

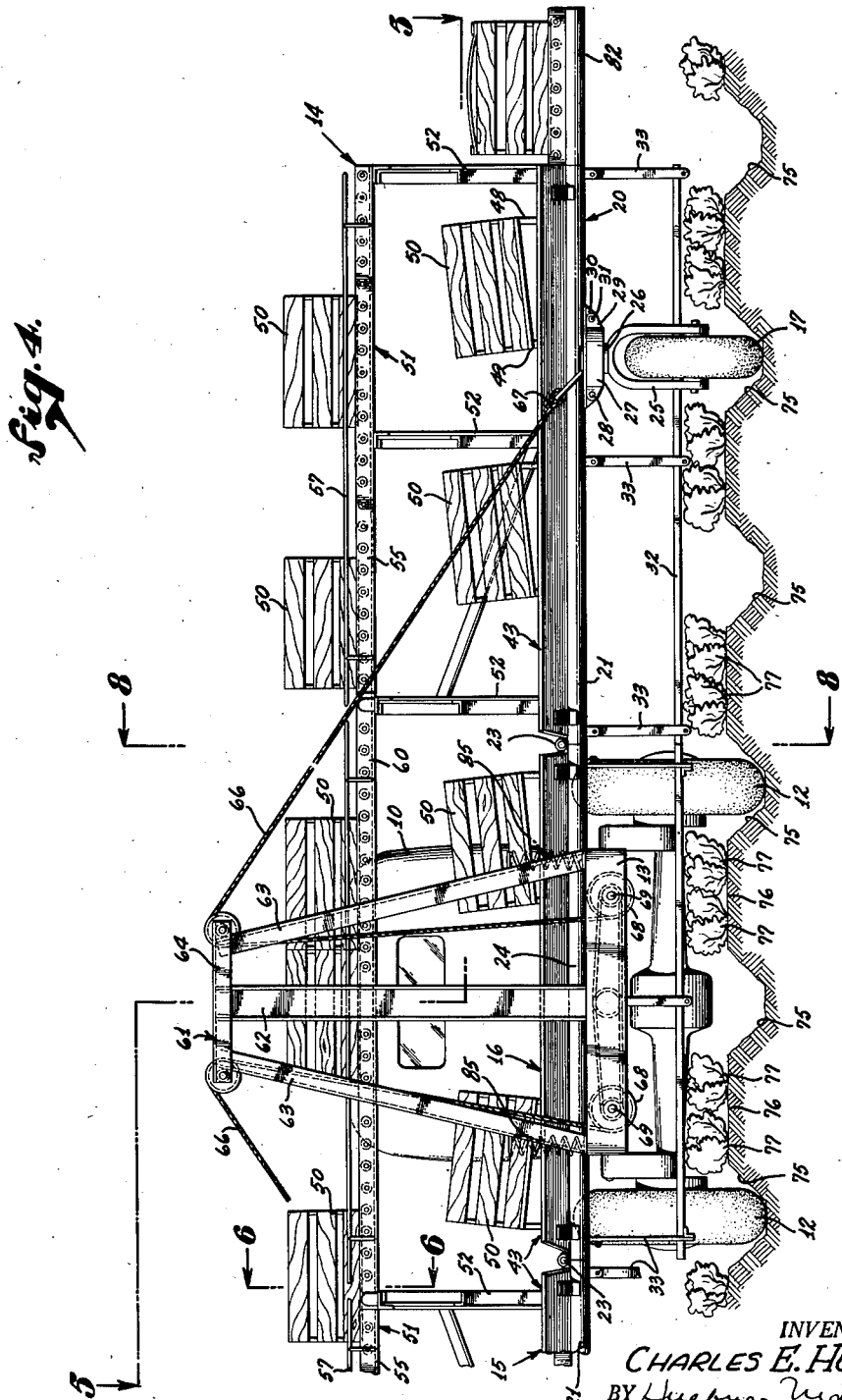

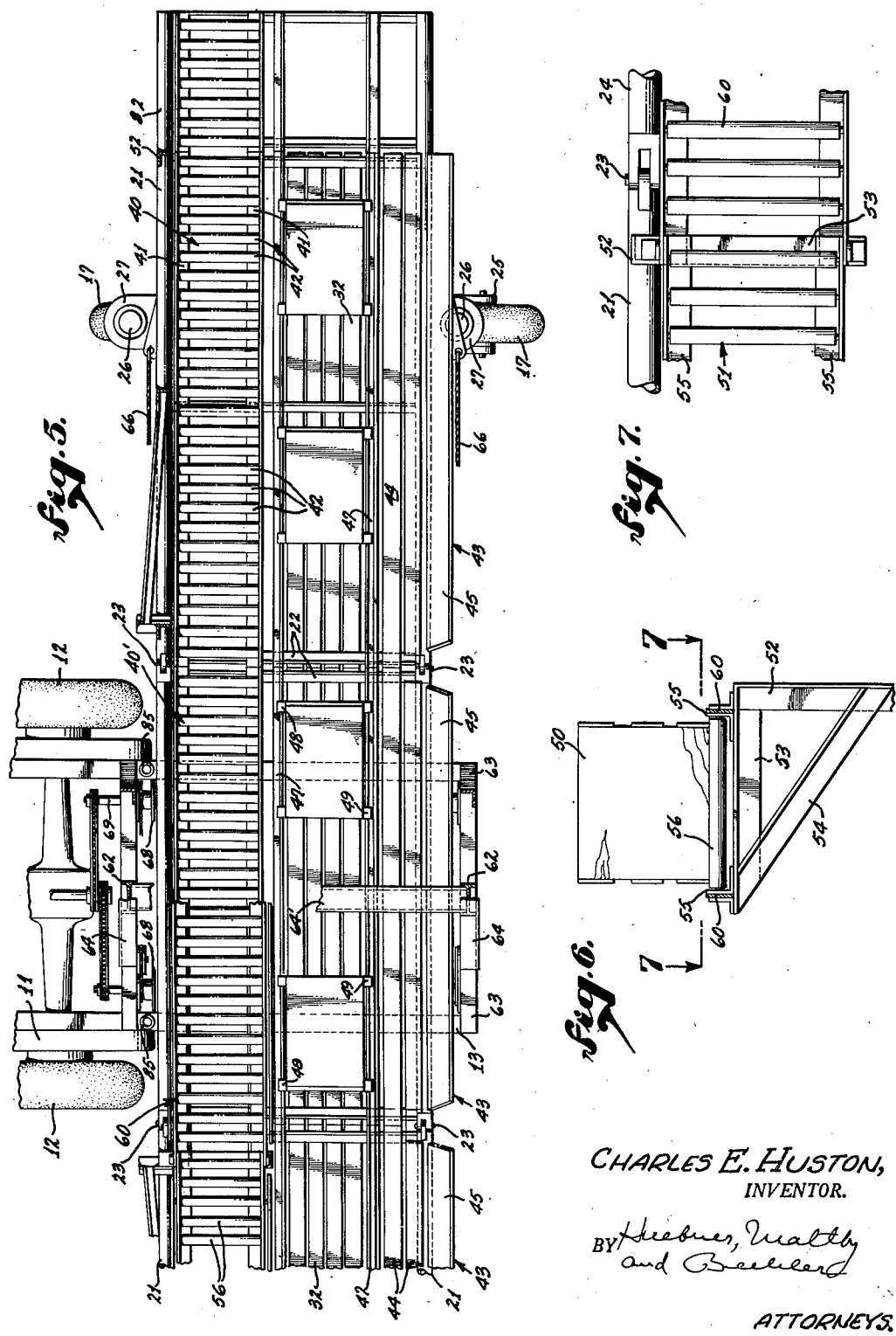

CHARLES E. HUSTON,
INVENTOR.

ATTORNEYS.

April 1, 1952  C. E. HUSTON  2,590,965
COLLAPSIBLE VEGETABLE PACKING APPARATUS
Filed Jan. 4, 1947  5 Sheets-Sheet 5

CHARLES E. HUSTON,
INVENTOR.

BY Huebner, Maltby
and Beehler

ATTORNEYS.

Patented Apr. 1, 1952

2,590,965

UNITED STATES PATENT OFFICE 2,590,965

COLLAPSIBLE VEGETABLE PACKING APPARATUS

Charles E. Huston, San Marino, Calif.

Application January 4, 1947, Serial No. 720,291

10 Claims. (Cl. 214—83.1)

1

The invention relates to vegetable packing apparatus and is specifically concerned with an apparatus which can be drawn through the fields where vegetables are grown bearing all of the necessary equipment for completely packing and crating the particular kind of vegetable grown there.

In agricultural areas, such as the vegetable growing sections of California, Arizona and elsewhere, vegetables of the nature of lettuce, cabbage, celery and the like are grown in vast quantities in fields covering hundreds of acres. Frequently, a single crop may tend to mature comparatively rapidly over a limited period of time.

In order to economically pick and harvest vegetables, it is a decided advantage to have a very large proportion of all the growing vegetables in the field picked and packed at about the same time. This is necessary not only to pack the crop at the most advantageous time, but also to coordinate the efforts of a large number of specialized workers so that the packing operation is performed economically.

Heretofore the industry has ordinarily utilized packing sheds somewhat centrally located with respect to a number of different growing areas. This practice has necessitated cutting the vegetables in the field, carting them to the packing sheds, there culling the vegetables so that the solid portions are separated from spoiled leaves and subsequently packing the vegetables.

After completion of the packing operation, the packed or crated vegetables must be reloaded on trucks and then carried to a railroad siding or other shipping point. In the meantime, culls and leaves must be separately disposed of, and these, in turn, must be loaded upon suitable trucks and carried back to the ranch where they are ordinarily spread upon the ground as a mulch. Packing processes such as the foregoing have required a great deal of extra handling and unnecessary loading and unloading of both bulk vegetables and crated vegetables between the time they are cut in the field and the time they are loaded into a refrigerator car or truck.

It is, therefore, among the objects of the invention to provide a new and improved transportable packing apparatus of unitary construction which can be moved through the fields and ranches along the furrows where the crops are grown and there enable operators of the apparatus to pick, cull, pack and immediately load packed vegetables upon trucks for transportation to shipping centers.

Another object of the invention is to provide a new and improved lettuce packing apparatus of unitary construction which is so equipped with wings or extensions that the wings can be spread over a great many rows of growing vegetables while the apparatus is being moved through the field or ranch and which is of such construction that the wings may be compactly folded in close arrangement upon the vehicle itself after the work is done so that the vehicle can be moved over roads and highways from one harvesting location to another.

Still another object of the invention is to provide a new and improved packing apparatus for vegetables and similar types of crops wherein a unitary vehicle is provided equipped with foldable wings which when extended are supported in part by wheels especially mounted upon the wings and which can be folded into a position upon a motor truck of conventional design with the extra wheels and appurtenances on the wings likewise folded into a compact arrangement so that the entire width of the device is not substantially greater than that of an ordinary truck designed for highway operation.

Still another object of the invention is to provide a new and improved unitary packing device for low growing vegetables which is adapted to be partially mounted upon and carried by an extension of an ordinary motor vehicle and so constructed that appurtenances such as swivel wheels, catwalks and foldable conveyors can all be neatly compacted into position upon the vehicle when not in operation in a field so as to minimize the inconvenience of transporting the entire apparatus from one field of operation to another or for storing it when the work is done.

With these and other objects in view, the invention consists in the construction, arrangement and combination of the various parts of the device whereby the objects contemplated are attained, as hereinafter set forth, pointed out in the appended claims, and illustrated in the accompanying drawings, in which:

Figure 1 is a rear elevational view of the apparatus with wings extended in position for operation in a field of growing vegetables.

Figure 2 is a rear view of the apparatus with wings folded for transportation of the apparatus over a highway.

Figure 3 is a side elevational view.

Figure 4 is a rear view of the apparatus drawn to a larger scale and partly broken away showing the location of empty and full crates on the device ready for a packing operation.

Figure 5 is a top view of the apparatus partly broken away.

Figure 6 is a cross-sectional view of the empty crate conveyor taken on the line 6—6 of Figure 4.

Figure 7 is a fragmentary top view of the empty crate conveyor taken on the line 7—7 of Figure 6 with the portion of the apparatus carried by the truck.

Figure 8:
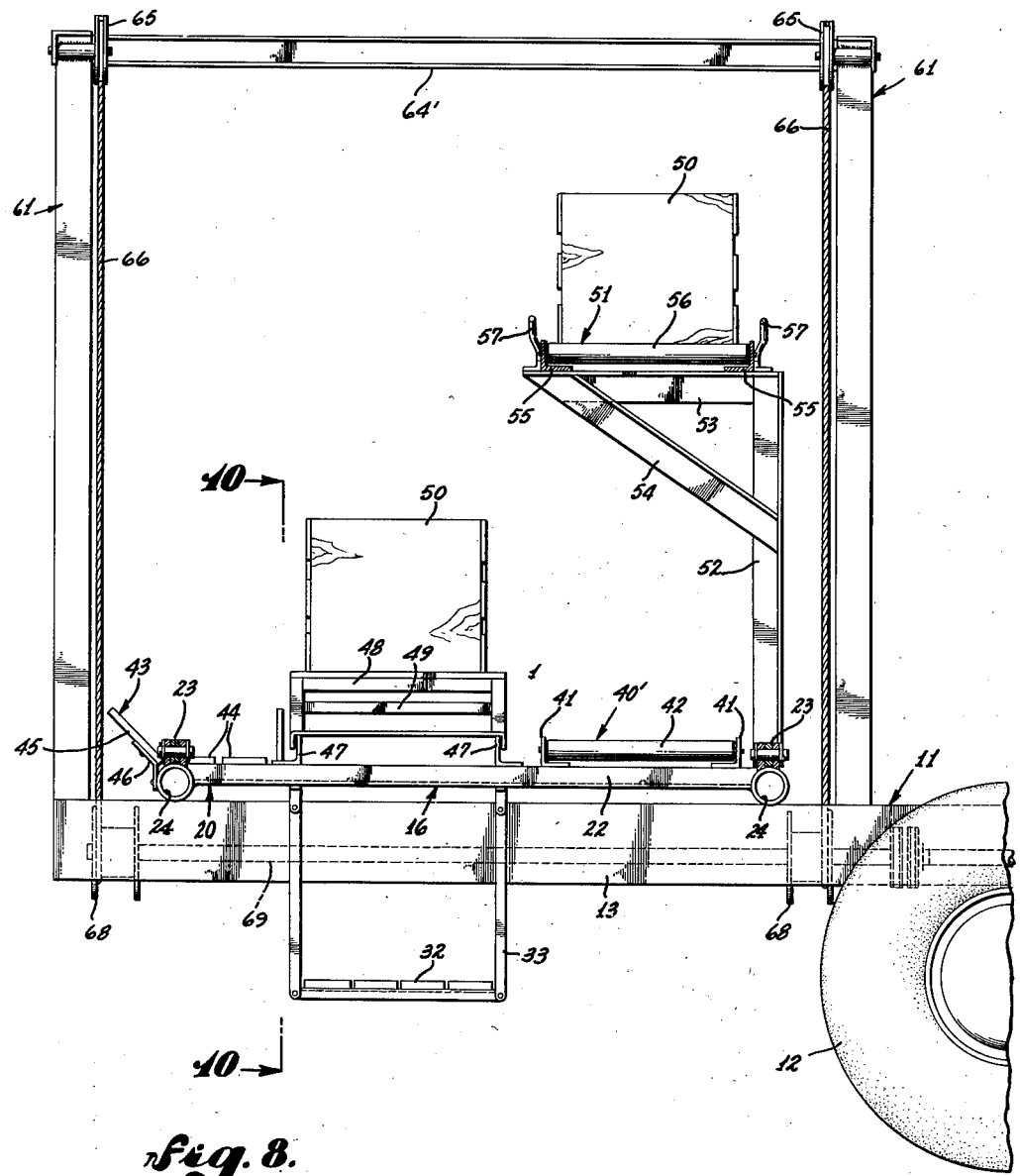
Figure 8 is a cross-sectional view of the device taken on the line 8—8 of Figure 4.
Figure 9:
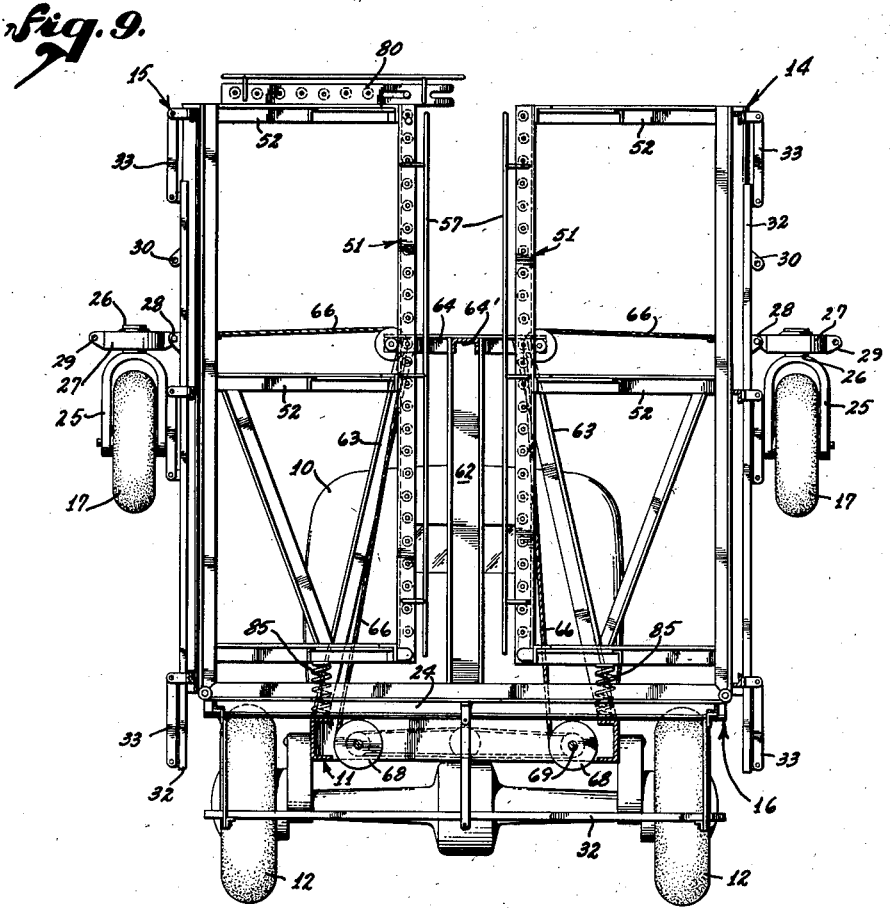
Figure 9 is a rear view of the device with wings in folded position drawn to a larger scale and illustrating details not shown in Figure 2.

In the design and construction of an apparatus adapted to the packing of vegetables such as lettuce, cabbage, celery and the like the apparatus must be one capable of traversing furrows between the rows in a manner such that the crops are not damaged during the packing operation. The design must, therefore, take into consideration not only the spacing of the wheels but also the location of the apparatus at an elevation sufficiently high above the ground so that the crops are not damaged. It is further desirable to take into consideration location of conveyors on the apparatus so that empty crates may be unloaded from motor trucks at one end location and full crates loaded from the packing apparatus upon other motor trucks at another end location while the apparatus is moving through the field.

For economical operation it is desirable to have the apparatus built in a way permitting as many rows of the vegetables as possible to be cut and packed during one traverse of the apparatus through the field. No conventional or other type of vehicle has heretofore been devised which can be adapted to this work. Further, because of the fact that the ground is apt to be soft, rough and irregular and sometimes wet and muddy, whatever vehicle is utilized for such a packing operation must be capable of being powered by a sufficiently heavy power unit to move a very considerable weight on wheels through the field. Heavy motor trucks have been found a very satisfactory propelling vehicle.

In order, however, to maintain a packing device relatively simple in design, it has been found advisable to rearrange the rear portion of a conventional motor truck to accommodate the packing apparatus rather than to resort to a separate trailing vehicle to be drawn behind a tractor or truck. In this respect the present invention is an improvement over my co-pending application, Serial No. 712,302, filed November 26, 1946, and now Patent No. 2,473,587, granted June 21, 1949.

In an embodiment chosen to illustrate the invention there is shown a motor truck which may be identified in part in Figures 1 and 2 by a cab 10, a truck body 11 and rear wheels 12. As will be more readily apparent in Figure 8, the truck body includes an auxiliary frame extension or platform 13 which protrudes a substantial distance rearwardly with respect to the rear wheels of the truck.

The packing apparatus consists essentially of wings or extensions, indicated generally by the reference characters 14 and 15, respectively, and an intermediate section 16 located immediately above and carried by the platform 13. Figure 1 shows the wings extended in the position they would occupy when the apparatus is traveling through a field and employed in a packing operation. Figure 2 shows the wings folded upwardly in a position above the body of the truck in a manner permitting the apparatus to be moved along a road or highway. As will be apparent from an inspection of Figures 1 and 2, the wings are jointed to the sides of the platform so that they may readily be lifted or lowered by some suitable crank located on the truck which will be referred to in greater particular as the description proceeds.

As further illustrated in Figure 1, the apparatus with the wings in extended position is adapted to completely overlie eight double rows of the growing vegetables which are being packed, the outer ends of the wings, furthermore, being extended over the next adjacent rows beyond. In ordinary practice the rows are on 40" centers so that the wheels 12 of the truck, being on 80" centers, permit the truck body to span two rows. For convenience, wheels 17 on the wings are spaced about 80" from the adjacent truck wheel so that the wheels 17 are also adapted to travel in furrows with the portion of the wing between the wheel and the truck wheel spanning two rows.

Inasmuch as each wing is substantially identical, a description of one will suffice to present a clear picture of both those illustrated in Figure 1, one of the wings being shown in greater detail in Figure 4. The wing 14 consists of a frame 20 which, as is apparent from Figure 8, may be made of laterally extending, parallel disposed tubing elements 21 secured together by cross-pieces 22. The tubing elements are, in turn, attached by means of hinges 23 to tubing elements 24 of similar shape which are secured by some suitable means to the platform 13 at the rear of the truck. In extended position the tubing elements 21 on both sides of the wings and the tubing elements 24 extending across the truck platform are continuous.

As previously described, wheels 17 are employed one beneath the rearward tubing element 21 and another beneath the forward tubing element, as is more readily apparent in Figure 3. The wheels 17 are connected to the tubing elements by means of a swivel mounting comprising a fork 25 having a shaft 26 pivotally secured in a block 27. The block, in turn, is hinged at the point 28 to a bracket attached to the tubing element on the side adjacent the truck. On the opposite side brackets 29 and 30 on the block and tubing element, respectively, may be secured together by a latch, here illustrated as a pin 31, which may be removed when the wing is to be elevated to a folded position. Likewise carried by the tubing elements and cross-pieces is a catwalk 32 which extends beneath the tubing elements where it is suspended by means of hangers 33 attached by pivoted connections.

Mounted directly upon the cross-pieces 22 along the forward side of the wing is a conveyor 40 upon which crates may be passed endwise with respect to the wing. The conveyor may be of substantially conventional construction consisting of angle members 41 at the sides supporting rollers 42 which extend between them. Each wing is provided with its own conveyor 40, and a section 40' of the conveyor extends across the platform at the rear of the truck so that in effect it is a continuation of the conveyors on the wings. On the side of the wing opposite from the conveyor there is built a trough 43 which consists of slats 44 extending across and carried by the cross-pieces 22 and an upwardly tilted slat 45 held by a bracket 46 to the tubing element 21 along the rear side of the wing. The trough is for the reception of the vegetables as they are piled upon the apparatus for packing.

Between the trough and the conveyor 40 is a packing space which provides for the location of packing stations spaced at suitable intervals longitudinally with respect to the wing. Angle members 47 extend over the cross-pieces to which they may be attached for additional bracing. These angle members provide supports for tilted crate rests identified by bases 48 and 49 of unequal height.

Figure 10:
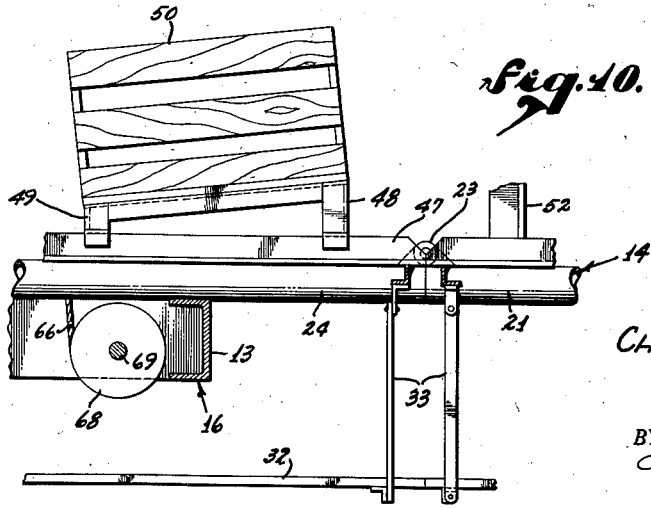
Figure 10 is a fragmentary elevational view of the loading conveyor taken on the line 10—10 of Figure 8.

Empty crates 50, as indicated in Figures 4, 8 and 10, may be positioned upon the crate rests in tilted position so as to facilitate packing. As indicated in Figures 4 and 5, the crate rests are designed to be located at spaced intervals so that sufficient space is left between them to permit a packer to stand on the catwalk and do the packing. As further illustrated in Figure 5, each wing is provided with two packing stations, and the platform at the rear of the truck is likewise provided with two packing stations with the crates in the last instance both being tilted toward the center.

So that empty crates may be passed to the various packing stations, there is provided an empty crate conveyor 51 which consists of a series of upstanding brackets 52 suitably spaced along the wings, each being provided with a horizontal piece 53 and a brace 54. Angle sections 55 extend across the tops of the horizontal pieces 53 and provide lateral supports for a series of rollers 56. Guards 57 may be located at the sides of the conveyor so that the empty crates 50 are retained in proper position upon the conveyor. The height of the conveyor 51 above the catwalk 32 is made such that a man standing upon the catwalk can readily reach the empty crates and lift them down to position them upon the crate rests at the several loading stations.

As previously indicated, the apparatus is designed so that the wings can be folded upwardly over the top of the platform at the rear of the truck, and this is permitted by reason of the character and location of the hinge 23. To further facilitate this operation, a removable section 60 comprising a portion of the empty crate conveyor is located at a position overlying the platform and adapted to be connected to adjacent ends of the conveyors 51, preferably immediately adjacent the brackets 52 of the wings which are nearest the hinges 23.

Any suitable expedient may be provided for permitting the ends of the section 60 to hook into the respective ends of the conveyors 51 on the wings. It is necessary to remove the section 60 when the wings are elevated so that they will rest on their inside ends upon the platform.

To lift the conveyors into a folded or nested position, there is provided upon the top of the platform a rack or rigging 61 consisting of a central column 62, side braces 63 and a transverse strut 64. Preferably, the rigging 61 is duplicated on opposite sides of the wings and connected by a beam 64'. Pulleys 65 are located on the rigging to support cables 66. The cables are anchored at 67 to the corresponding sides of the wings at a point adjacent the wheels 17. At the other ends the cables are wound around drums 68 secured to shafts 69 which, in turn, are connected to a suitable motor (not shown) but located on the truck. Either an auxiliary motor may be provided or by a proper clutch the truck motor may be utilized. There will preferably be provided a shaft 69 for each wing since the shafts turn in reverse directions.

When the device is to be used, the truck upon which it is mounted is driven into the field where the low growing crop is ready for harvesting. In the example chosen for the purpose of illustration, the field is indicated as one being devoted to the growing of lettuce. As indicated in Figure 4, furrows 75 are located on about 40" centers and define hills 76 therebetween, each hill being planted with two rows 77 of lettuce. Lettuce ordinarily grows to a height such that the catwalk 32 will clear the tops of the heads of lettuce by a comfortable margin when the wheels 12 of the truck and wheels 17 on the wings are riding in the bottoms of the furrows 75.

Initially, however, the wings will be in folded position as illustrated in Figure 2. With the wings in the position there shown the cables 66 are released, and the wings will fall outwardly to the positions shown in Figure 1. As the wings are lowered mountings for the wheels 17 pivot about the hinges 28 and permit the treads of the wheels to contact the ground as soon as the wings are fully lowered. When the weight of the wings is permitted to rest upon the wheel mountings, the blocks 27 will be pressed against the tubing elements 21 to a position where the pins 31 can be pressed into place and the blocks 27 thereby locked in position.

The catwalk 32, which in folded position lies compactly against the wing, in each case begins to extend outwardly as the wing is dropped swinging upon its hangers 33 until it assumes the position shown in Figure 1 wherein the wheels 17 rest upon the ground. By providing a catwalk mounting which can be swung in this manner the over-all width of the apparatus in folded position is minimized.

The conveyors 51 are ordinarily maintained rigidly in their erected position. The apparatus will then be ready for a packing operation, as clearly shown in Figures 1 and 4. Some tension may be maintained on the cables 66, if preferred, but because of the relative unevenness of the fields it is better to permit the ends of the wings to lift and lower with a certain amount of freedom as the wheels 17 roll over high spots and low spots. As soon as the wings are lowered, the section 60 of the empty crate conveyor may be hooked in place, the hooking arrangement being preferably made such that there is a certain amount of play at the connections so as not to restrict the lifting and lowering of the wings above referred to.

In order that the operation of the device may be as convenient and efficient as possible, a conveyor extension 80 for the empty crate conveyor is lifted into the position shown in Figure 1. A somewhat similar extension 82 for the full crate conveyor may also be utilized if trucks in attendance upon the apparatus are to be run along the rows at a reasonable distance from the apparatus.

The apparatus is then ready for a packing operation. Prior to its passage through the field cutters walk along the furrows and cut those of the heads of lettuce which are ready for packing, turning them upside down on the ground in the positions shown in Figure 8. Some culling and removal of dead or withered leaves on the outside of the heads may be done at this time.

After a sufficient number of heads of lettuce are cut, the apparatus begins its travel along the furrows and over the rows of cut lettuce. Men in attendance pick the lettuce from the ground and toss it into the trough 43. In the meantime, an attending motor truck loaded with empty crates is permitted to travel along the left side of the apparatus as viewed in Figure 1, and the empty crates may be deposited one at a time upon the extension 80 of the empty crate conveyor 51. Empty crates pass over the rollers across the wings. Packers riding upon the catwalk then lift empty crates from the empty crate conveyor and place them upon the crate rests 48, 49 at the respective loading stations. The packers then load the crates with heads of lettuce from the trough 43, usually packing the heads in layers of sixteen heads to a depth of three layers to fill the crates. When the crates are packed, the packers lift the crates from the crate rests to the full crate conveyor 40, and the full crates are then passed to the side of the apparatus opposite from the side from which the empty crates are loaded upon it.

If desired, a mechanical topper may be located at a convenient position near the left side of the apparatus, as viewed in Figures 1 and 4, or the crates may be topped by hand. Full crates are passed along the conveyor over the extension 82 where they may be immediately loaded upon an attending motor truck. This truck may likewise carry upon its platform tops which can then be conveniently passed to the operator who is attending this operation. The crates may be topped on the wing of the apparatus or on the attending truck if preferred.

As soon as the attending truck has been loaded with packed crates of the vegetables, it can be driven off and the next truck driven into place. In this way there need be no interruption at any time of travel of the apparatus along the rows or of any packing operations in progress upon the apparatus. The apparatus may continue its movement throughout the day until the entire field has been picked, packed and loaded upon trucks capable of carrying away the packed vegetables.

After a field has been picked over, if the field be a large one, the apparatus may be started again through the field and the crop picked over a second, third or even a fourth time if need be. Because of the fact that only the cutters need work along the furrows, substantially no damage results to the growing vegetables which are uncut during the first packing operation. The fact that the field can be kept clean and undamaged by reason of the apparatus being capable of carrying most of the workers assures great economy in packing the yield of the field.

After a field has been picked over sufficiently to complete the packing of all available vegetables, the apparatus can then be folded up as previously suggested to the position shown in Figure 2. When the apparatus is to be folded, the pins 31 are withdrawn, and the section 60 of the empty crate conveyor is removed. The extensions 80 and 82 also are folded down and the shafts 69 then rotated to roll up the cables 66 until the wings are lifted to a vertical position on the top of the platform. So that the wings may ride smoothly upon the platform during transportation over the fields or over the highway, spring cushions 85 are provided at the sides of the platform against which end portions of the wings abut when the wings are in folded position.

In providing an apparatus of the type described working parts have been held to a minimum and the framework made of a construction as light as possible commensurate with the strength required in order to support and carry through the fields a sufficient number of workmen and the necessary conveyors for carrying both empty and loaded crates. The device is made sufficiently flexible so that its operation is undisturbed by unevenness in the ground. The wings will have sufficient length so that as wide a band as possible of the ground is worked during a single traverse of the apparatus. Further, by reason of the fact that the parts can be folded vertically, wings of considerable length can be used for the packing operation. These can be folded above the truck so that the entire apparatus in folded position occupies substantially the same amount of space as an ordinary heavy motor truck which may be driven along the highway.

By mounting the apparatus shown on a conventional motor truck, the apparatus can be transported over great distances and from one section of the country to another as crops mature in different regions. Being mounted upon a conventional motor truck, the apparatus may be transported quickly and efficiently for long distances over the highway and be immediately ready for a new operation promptly upon the arrival at the new location. By concentrating all phases of the packing process in a mobile unit operating in the field, speed in completely packing the yield of a ranch or farm is greatly increased, and damage to the remaining crop is held to a minimum.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures.

The invention having been herein described, what is claimed and sought to be secured by Letters Patent is:

1. A vegetable packing apparatus comprising a power vehicle having an auxiliary frame extension at one end, wings extending laterally from the extension and having a hinged connection thereto, aligned catwalk sections suspended beneath the wings and the extension, aligned full-crate conveyor sections on the wings and the extension, and aligned empty-crate conveyor sections supported above the wings and the extension, said wings together with the respective catwalks and conveyor sections being collapsible upon the vehicle into a compact arrangement suitable for highway travel.

2. A vegetable packing apparatus comprising a wheeled vehicle, an auxiliary frame on said vehicle, laterally extending wings having horizontally hinged connections to the frame, means connected to the vehicle and the wings adapted to lift said wings to folded position above the vehicle, a series of aligned crate conveyor elements on the wings and a removable connecting section therebetween, a second series of aligned crate conveyor elements on the wings and the frame located below the first series, catwalks on the wings and said frame located below said second series of crate conveyor elements, wheels near the outer ends of the wings and mountings for the wheels on the wings.

3. A vegetable packing apparatus comprising a wheeled vehicle, a rearwardly extending auxiliary frame on the vehicle, laterally extending wings having movable connections to the frame, a crank device on the vehicle and connections from the crank device to the respective wings adapted to lift said wings to folded substantially vertical positions, a series of aligned fixed crate conveyor elements on the wings and a removable connecting section therebetween, a second series of aligned full crate conveyor elements on the wings and frame, catwalks on the wings and said frame, the parts of said catwalks on the wings being foldable against the wings when said wings are lifted, wheels near the outer ends of the wings and mountings for the wheels comprising a swivel base member for each wheel, each said base member being hinged to the wing whereby said wheels are adapted to fold against the wings in collapsed position and project downwardly therefrom in extended position.

4. A vegetable packing apparatus comprising a wheeled vehicle, a rearwardly extending auxiliary frame on the vehicle, laterally extending wings having movable connections to the frame, an upstanding rack on the vehicle in alignment with the wings, a crank device on the vehicle and cables from the crank device extending through pulleys on the rack to the respective wings adapted to lift said wings to folded substantially vertical positions, elevated and aligned empty-crate conveyors fixed upon the wings and a removable connecting section therebetween, aligned and fixed full-crate conveyors on the wings and the frame on a substantially horizontal plane below the first conveyors, aligned catwalks on the wings and said frame, the parts of said catwalks on the wings being collapsible against the wings when said wings are lifted, wheels near the outer ends of the wings and mountings for the wheels comprising a swivel base member for each wheel, each said base member being movably attached at one side and having a releasable latch on the opposite side whereby said wheels are folded against the wings in collapsed position and project downwardly therefrom in extended position and are adapted in said last position to support the wings.

5. A vegetable packing apparatus comprising a wheeled vehicle, a rearwardly extending auxiliary frame on the vehicle, laterally extending wings having pivot connections to the frame wherein the pivot axes are horizontal, an upstanding rack on the frame in alignment with the wings having sides disposed inwardly at the top, a crank device on the vehicle and cables from the crank device extending through pulleys on the rack to the respective wings adapted to lift said wings to collapsed substantially vertical positions, aligned and fixed empty-crate conveyors on the wings and a removable connecting section therebetween, aligned and fixed full-crate conveyors on the wings and the frame, aligned catwalks suspended beneath the wings and said frame, and tilted crate rests at longitudinally spaced intervals above the catwalks defining a series of packing stations, the parts of said catwalks on the wings being collapsible against the wings when the wing are lifted, front and rear wheels near the outer ends of the wings and mountings for the wheels comprising a swivel base member for each wheel, each said base member being hinged at the side nearest the vehicle and having a removable latch at the opposite side whereby said wheels are adapted to fold against the wings in collapsed position and tilt outwardly therefrom in extended position and are adapted in said last position to support the wings.

6. A vegetable packing apparatus comprising a wheeled vehicle including a frame portion, a pair of wings extending laterally of the frame portion having horizontally pivoted connections to the frame portion, an upper crate conveyor on each wing and a lower crate conveyor on each wing parallel to the upper crate conveyor and in substantially horizontal alignment with said frame portion, means providing packing stations on the wings below and laterally disposed with relation to said lower crate conveyors, vegetable receptacles adjacent the packing stations and an elevator operatively connected between the vehicle and the wings adapted to shift said wings to vertical positions above said frame portion.

7. A vegetable packing apparatus comprising a wheeled vehicle including a frame portion extending rearwardly of the wheels, a pair of wings extending laterally of the frame portion having at the lower level thereof horizontally pivoted hinged connections to the frame portion, an upper crate conveyor on each wing and a lower crate conveyor at the lower level of each wing in substantially horizontal alignment with said frame portion, said upper and lower crate conveyors having connecting portions between ends thereof adjacent the frame portion, means providing packing stations on the wings below and laterally disposed with relation to said lower crate conveyors, vegetable receptacles adjacent the packing stations and an elevator operatively connected between the vehicle and the wings adapted to shift said wings to vertical positions above the frame portion.

8. A vegetable packing apparatus comprising a wheeled vehicle including a frame portion extending rearwardly of the wheels, a pair of wings extending laterally of the frame portion having upper and lower levels, a horizontally disposed hinged connection between the frame and the lower levels of the respective wings, an upper crate conveyor at the upper level of each wing and a removable connecting portion between the inner ends of said upper crate conveyor, a lower crate conveyor at the lower level of each wing in substantially horizontal alignment with said frame portion and a connecting crate conveyor section on the frame portion between adjacent ends of the lower crate conveyors, means providing packing stations on the wings extending along said lower crate conveyor below and laterally disposed with relation thereto, vegetable receptacles on said wings at substantially the level of the lower crate conveyors and an elevator operatively connected between the vehicle and the wings adapted to shift said wings to vertical positions above the frame portion.

9. A vegetable packing apparatus comprising a vehicle having a frame, wings having hinges connecting the wings to the sides of the frame with pivot axes of the hinges extending substantially parallel to the longitudinal axis of the vehicle, catwalk sections extending below and parallel to the wings in alignment with each other in open position of the wings and hinges between the catwalk sections and the wings with axes thereof parallel to the axes of the first-identified hinges, full crate conveyor sections on the wings and the vehicle in alignment with each other in open position of the wings, empty crate conveyor sections on the wings and the vehicle in alignment with each other in open position of the wings, said wings, said catwalks and said conveyor sections on the wings being collapsible upon the vehicle to mutually parallel and substantially vertical positions suitable for highway travel.

10. A vegetable packing apparatus comprising a vehicle having a frame, a wing having a hinge connecting the wing to one side of the frame with the pivot axis of the hinge substantially parallel to the longitudinal axis of the vehicle, a catwalk section extending below and parallel to the wing and hinges between the catwalk section and the wing with axes thereof parallel to the first identified axis, a full crate conveyor section on the wing, an empty crate conveyor section mounted upon and about the wing parallel to the full crate conveyor section, said wing, said catwalk and said conveyor sections being collapsible upwardly upon the vehicle to vertical positions suitable for highway travel.

CHARLES E. HUSTON.

REFERENCES CITED

The following references are of record in the file of this patent:

UNITED STATES PATENTS

| Number | Name | Date |
|---|---|---|
| 1,504,846 | Tarkington | Aug. 12, 1924 |
| 1,558,014 | Jaenicke | Oct. 20, 1925 |
| 2,005,442 | Spiegl | June 18, 1935 |
| 2,057,280 | Spiegl | Oct. 13, 1935 |
| 2,267,234 | Garber | Dec. 23, 1941 |
| 2,321,387 | Jackson | June 8, 1943 |
| 2,357,549 | Roberson | Sept. 5, 1944 |